US010681082B2

(12) United States Patent
Pedersen et al.

(10) Patent No.: US 10,681,082 B2
(45) Date of Patent: *Jun. 9, 2020

(54) HEARING DEVICE WITH COMMUNICATION PROTECTION AND RELATED METHOD

(71) Applicant: GN Hearing A/S, Ballerup (DK)

(72) Inventors: Brian Dam Pedersen, Ringsted (DK); Allan Munk Vendelbo, Valby (DK)

(73) Assignee: GN Hearing A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,894

(22) Filed: Sep. 13, 2018

(65) Prior Publication Data

US 2019/0014147 A1    Jan. 10, 2019

Related U.S. Application Data

(63) Continuation of application No. 15/448,375, filed on Mar. 2, 2017, now Pat. No. 10,154,059, which is a (Continued)

(30) Foreign Application Priority Data

Dec. 12, 2014  (DK) .................................. 2014 70779
Dec. 12, 2014  (EP) ..................................... 14197823

(51) Int. Cl.
*H04L 29/06* (2006.01)
*H04L 9/14* (2006.01)
(Continued)

(52) U.S. Cl.
CPC ........ *H04L 63/1466* (2013.01); *H04L 9/0822* (2013.01); *H04L 9/0869* (2013.01);
(Continued)

(58) Field of Classification Search
CPC ............. H04L 63/1466; H04L 63/0435; H04L 63/061; H04L 63/067; H04L 63/1483;
(Continued)

(56) References Cited

U.S. PATENT DOCUMENTS 4,126,761 A * 11/1978 Graupe .................... H04K 1/02
                                                380/276
6,851,048 B2 * 2/2005 Armitage ............... H04R 25/70
                                                381/314
(Continued)

FOREIGN PATENT DOCUMENTS

EP        2 760 225 A1    7/2014

OTHER PUBLICATIONS

Extended European Search Report dated Jun. 2, 2015 for corresponding European Patent Application No. 14197823.9, 8 pages.
(Continued)

*Primary Examiner* — Michael S McNally
(74) *Attorney, Agent, or Firm* — Vista IP Law Group, LLP

(57) ABSTRACT

A hearing device includes: a processing unit configured to compensate for hearing loss of a user of the hearing device; and an interface; wherein the processing unit is configured to: receive a session request for a session via the interface, obtain and store a session key, encrypt the session key based on a hearing device key, send a session response comprising the encrypted session key, and receive session data in the session via the interface.

39 Claims, 5 Drawing Sheets

Related U.S. Application Data continuation of application No. 14/573,697, filed on Dec. 17, 2014, now Pat. No. 9,608,807.

(51) Int. Cl.
| | |
|---|---|
| *H04R 25/00* | (2006.01) |
| *H04W 12/00* | (2009.01) |
| *H04W 12/04* | (2009.01) |
| *H04L 9/08* | (2006.01) |
| *H04L 9/30* | (2006.01) |
| *H04L 9/32* | (2006.01) |
| *H04W 12/06* | (2009.01) |

(52) U.S. Cl.
CPC ............. *H04L 9/0894* (2013.01); *H04L 9/14* (2013.01); *H04L 9/30* (2013.01); *H04L 9/3242* (2013.01); *H04L 9/3247* (2013.01); *H04L 63/0435* (2013.01); *H04L 63/061* (2013.01); *H04L 63/067* (2013.01); *H04L 63/1483* (2013.01); *H04R 25/554* (2013.01); *H04R 25/70* (2013.01); *H04W 12/003* (2019.01); *H04W 12/04* (2013.01); *H04W 12/06* (2013.01); *H04L 63/045* (2013.01); *H04L 2209/80* (2013.01); *H04L 2209/88* (2013.01); *H04R 25/558* (2013.01); *H04R 2225/55* (2013.01)

(58) Field of Classification Search
CPC ... H04L 63/045; H04L 9/0822; H04L 9/0869; H04L 9/0894; H04L 9/14; H04L 9/30; H04L 9/3242; H04L 9/3247; H04R 25/554; H04R 25/70; H04R 25/558; H04W 12/04; H04W 12/06
USPC ......................................................... 713/176
See application file for complete search history.

(56) References Cited

U.S. PATENT DOCUMENTS

| | | | |
|---|---|---|---|
| 8,904,195 | B1 | 2/2014 | Rahat et al. |
| 8,745,394 | B1 | 3/2014 | Rahat et al. |
| 8,874,913 | B1 | 10/2014 | Monica et al. |
| 2003/0088765 | A1 | 8/2003 | Eschbach et al. |
| 2003/0165239 | A1* | 9/2003 | Bantz ................. H04K 1/00 380/53 |
| 2005/0141712 | A1* | 6/2005 | Koo ................. G06Q 20/102 380/231 |
| 2005/0235354 | A1* | 10/2005 | Griesdorf ......... G01R 31/31719 726/17 |
| 2008/0020707 | A1* | 1/2008 | Takayama ............ H04L 63/045 455/41.2 |
| 2009/0003637 | A1* | 1/2009 | Pansell .................. H04R 25/55 381/314 |
| 2010/0205447 | A1* | 8/2010 | Waldmann ............. H04R 25/70 713/182 |
| 2011/0126014 | A1 | 5/2011 | Camp, Jr. et al. |
| 2011/0178363 | A1* | 7/2011 | Van Herck ........... H04R 25/505 600/25 |
| 2012/0140962 | A1* | 6/2012 | Ubezio ................ H04R 25/558 381/314 |
| 2014/0143582 | A1* | 5/2014 | Kindred .................... G06F 1/12 713/400 |
| 2014/0341405 | A1* | 11/2014 | Pedersen .............. H04R 25/554 381/315 |
| 2016/0173278 | A1 | 6/2016 | Pedersen et al. |

OTHER PUBLICATIONS

First Technical Examination dated Jul. 13, 2015, for corresponding Danish Patent Application No. PA 2014 70779, 7 pages.
Non-final Office Action dated Feb. 23, 2016, for related U.S. Appl. No. 14/573,697.
Final Office Action dated Sep. 12, 2016, for related U.S. Appl. No. 14/573,697.
Notice of Allowance and Fee(s) due dated Nov. 23, 2016 for related U.S. Appl. No. 14/573,697.
Non-final Office Action dated Jun. 12, 2017 for related U.S. Appl. No. 15/354,341.
Final Office Action dated Dec. 14, 2017 for realted U.S. Appl. No. 15/354,341.
Notice of Allowance and Fee(s) due dated Mar. 15, 2018 for related U.S. Appl. No. 15/354,341.
Non-final Office Action dated Sep. 19, 2017 for related U.S. Appl. No. 15/448,375.
Final Office Action dated Mar. 19, 2018 for related U.S. Appl. No. 15/448,375.
Notice of Allowance and Fee(s) due dated Aug. 3, 2018 for related U.S. Appl. No. 15/448,375.

* cited by examiner

HEARING DEVICE WITH COMMUNICATION PROTECTION AND RELATED METHOD

RELATED APPLICATION DATA

This application is a continuation of U.S. patent application Ser. No. 15/448,375 filed on Mar. 2, 2017, now U.S. Pat. No. 10,154,059, which is a continuation of U.S. patent application Ser. No. 14/573,697, filed Dec. 17, 2014, issued as U.S. Pat. No. 9,608,807, which claims priority to and the benefit of Danish Patent Application No. PA 2014 70779 filed on Dec. 12, 2014, pending, and European Patent Application No. 14197823.9 filed on Dec. 12, 2014, pending. The entire disclosures of all of the above applications are expressly incorporated by reference herein.

FIELD

The present disclosure relates to a hearing device with communication protection and related method, and in particular to a hearing device for communicating securely with accessory devices/systems and related method.

BACKGROUND

The functionality of a hearing device becomes increasingly advanced. Wireless communication between a hearing device and external devices, such as hearing device fitting apparatus, tablets, smart phones and remote controllers, has evolved. A wireless communication interface of a hearing device uses open standard-based interface. However, this poses many challenges in terms of security. A hearing device may assume any incoming data as legitimate, and may allow memory to be written or changed by an unauthorized party. Any such attacks may result in a malfunction of the hearing aid, or a battery exhaustion attack.

However, a hearing device is a very small device with strict constraints in terms of computational power, memory space etc. Off-the-shelf security algorithms and protocols cannot be readily functional on a hearing device.

SUMMARY

There is a need for a hearing device with reduced risk of a third party accessing any part of the hearing device.

Disclosed is a hearing device comprising a processing unit configured to compensate for hearing loss of a user of the hearing device. The hearing device comprises a memory unit and an interface. The processing unit is configured to receive a session request for a session via the interface; obtain and/or store a session key; and encrypt the session key, e.g. based on a hearing device key. The processing unit is configured to send a session response, e.g. comprising the encrypted session key; and receive session data in the session via the interface.

Also disclosed is a method for communication with a hearing device comprising a processing unit, a memory unit, and an interface. The method comprises receiving a session request for a session via the interface; obtaining and/or storing a session key, e.g. in the memory unit; and encrypting the session key, e.g. based on a hearing device key. The method comprises sending the encrypted session key; and receiving session data in the session via the interface.

The method and hearing device as disclosed provide secure access control to the hearing device, such as secure access to the memory of the hearing device. It is an advantage of the present disclosure that the hearing device is able to filter out un-desired (e.g. unauthorized) communication at a session initiation and thus not unnecessarily consume power to communicate with undesired parties. The disclosed hearing device thus has the advantage of detecting any modification by unauthorized parties. The hearing device disclosed herein is advantageously protected against attacks such as spoofing attacks, man-in-the-middle attacks, and/or replay-attacks.

A hearing device includes: a processing unit configured to compensate for hearing loss of a user of the hearing device; and an interface; wherein the processing unit is configured to: receive a session request for a session via the interface, obtain and store a session key, encrypt the session key based on a hearing device key, send a session response comprising the encrypted session key, and receive session data in the session via the interface.

Optionally, the processing unit is configured to verify an integrity of the session data.

Optionally, the processing unit is configured to terminate the session if the integrity of the session data is corrupted.

Optionally, the session data comprises a message authentication code, and wherein the processing unit is configured to verify the integrity of the session data by verifying the message authentication code with the stored session key.

Optionally, the session data comprises a digital signature, and wherein the processing unit is configured to verify the integrity of the session data by verifying the digital signature.

Optionally, the hearing device further includes a memory unit, and wherein the processing unit is configured to: decrypt the session data with the session key, and store at least a part of the decrypted session data in the memory unit.

Optionally, the processing unit is configured to terminate the session if decryption of the session data fails.

Optionally, the session data comprises fitting data, hearing device operating parameters, and/or firmware data.

Optionally, the processing unit is configured to compensate for the hearing loss of the user of the hearing aid according to the received session data.

Optionally, the session key is a symmetric key.

Optionally, the processing unit is configured to obtain the session key by generating a random or pseudo-random number with a number generator contained in the hearing device.

Optionally, the hearing device key is a symmetric key or a public key of a private-public key pair.

Optionally, the processing unit is configured to send a hearing device identifier in the session response.

Optionally, the hearing device key is stored in a permanent memory of the hearing device.

A method for communication with a hearing device comprising a processing unit and an interface, the method includes: receiving a session request for a session via the interface; obtaining and storing a session key; encrypting the session key based on a hearing device key; sending a session response comprising the encrypted session key; and receiving session data in the session via the interface.

Optionally, the method further includes verifying an integrity of the session data.

Optionally, the method further includes terminating the session if the integrity of the session data is corrupted.

Optionally, the method further includes: decrypting the session data with the session key; and storing at least a part of the decrypted session data in a memory unit of the hearing device.

A hearing device includes: a processing unit configured to compensate for hearing loss of a user of the hearing device; and an interface; wherein the processing unit is configured to: receive a session request for a session via the interface, receive or generate a session key, encrypt the session key based on a hearing device key, send a session response comprising the encrypted session key, and receive session data in the session via the interface.

Optionally, the hearing device further includes a memory unit, and wherein the processing unit is configured to: decrypt the session data with the session key, and store at least a part of the decrypted session data in the memory unit.

Optionally, the processing unit is configured to terminate the session if decryption of the session data fails.

Optionally, the session data comprises fitting data, hearing device operating parameters, and/or firmware data.

Optionally, the processing unit is configured to compensate for the hearing loss of the user of the hearing aid according to the received session data.

Optionally, the session key is a symmetric key.

Optionally, the processing unit is configured to generate the session key by generating a random or pseudo-random number with a number generator contained in the hearing device.

Optionally, the hearing device key is a symmetric key or a public key of a private-public key pair.

Optionally, the processing unit is configured to send a hearing device identifier in the session response.

Optionally, the hearing device key is stored in a permanent memory of the hearing device.

Optionally, the processing unit comprises an encryption unit configured to encrypt the session key based on the hearing device key.

Optionally, the processing unit is configured to receive, not generate, the session key.

Optionally, the processing unit is configured to generate, not receive, the session key.

A hearing device includes: a processing unit configured to compensate for hearing loss of a user of the hearing device; and an interface; wherein the processing unit is configured to: receive a session request for a session via the interface, receive or generate a session key, encrypt the session key based on a hearing device key, send a session response comprising the encrypted session key, receive session data in the session via the interface, and verify an integrity of the session data.

Optionally, the processing unit comprises a verifier configured to verify the integrity of the session data.

Optionally, the processing unit further comprises a terminator configured to terminate the session if the verifier determines that the integrity of the session data is corrupted.

Optionally, the processing unit is configured to terminate the session if the verifier determines that the integrity of the session data is corrupted.

Optionally, the session data comprises a message authentication code, and wherein the processing unit is configured to verify the integrity of the session data by verifying the message authentication code with the stored session key.

Optionally, the session data comprises a digital signature, and wherein the processing unit is configured to verify the integrity of the session data by verifying the digital signature.

Optionally, the session data comprises fitting data, hearing device operating parameters, and/or firmware data.

Optionally, the processing unit is configured to compensate for the hearing loss of the user of the hearing aid according to the received session data.

Optionally, the session key is a symmetric key.

Optionally, the processing unit is configured to generate the session key by generating a random or pseudo-random number with a number generator contained in the hearing device.

Optionally, the hearing device key is a symmetric key or a public key of a private-public key pair.

Optionally, the processing unit is configured to send a hearing device identifier in the session response.

Optionally, the hearing device key is stored in a permanent memory of the hearing device.

Other features and embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
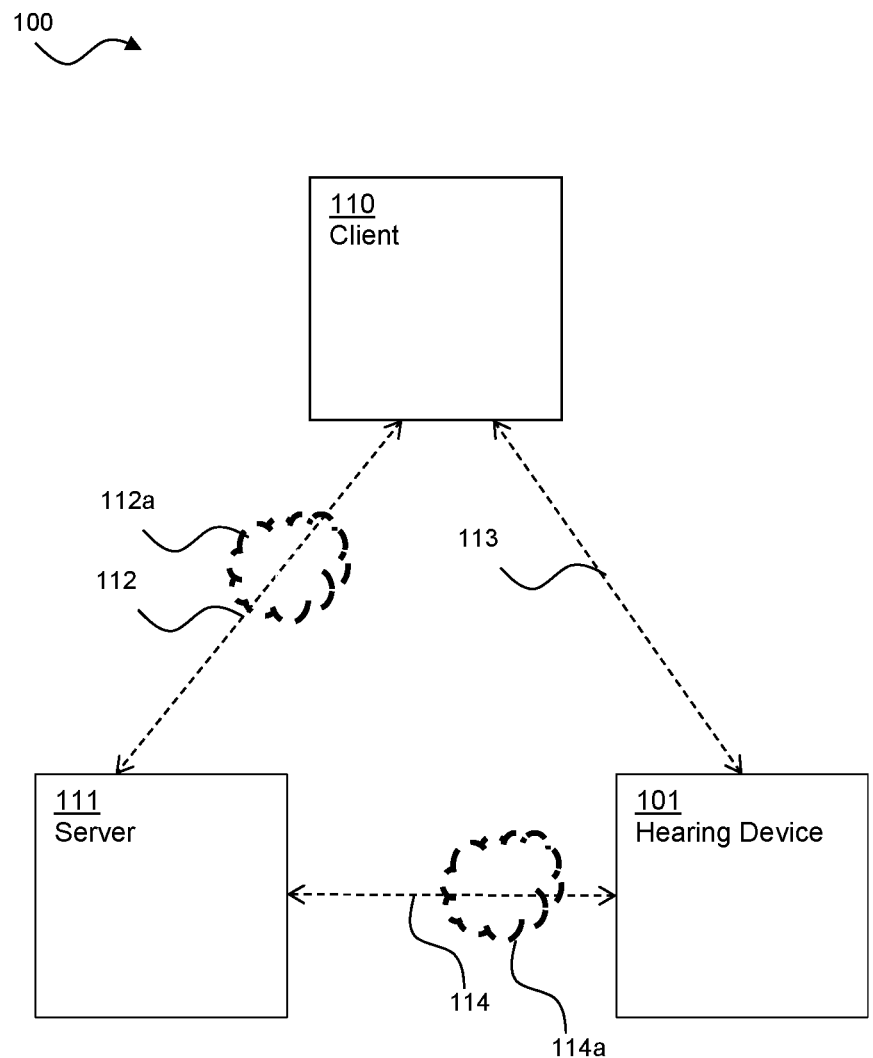
FIG. 1 schematically illustrates an exemplary architecture according to this disclosure, FIG. 2 schematically illustrates an exemplary hearing device, FIG. 3A schematically illustrates an exemplary signalling diagram, FIG. 3B schematically illustrates an exemplary signalling diagram, and FIG. 4 schematically illustrates a flowchart of an exemplary method.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. Throughout, the same reference numerals are used for identical or corresponding parts.

It is an object of the present disclosure is to provide a hearing device, and a method which seeks to mitigate, alleviate, or eliminate one or more of the above-identified deficiencies in the art and disadvantages singly or in any combination.

The present disclosure relates to improved security of a hearing device. Security comprise in assessing threats, vulnerabilities and attacks and developing appropriate safeguards and countermeasures to protect against threats and attacks. The present disclosure relates to a hearing device comprising a processing unit configured to compensate for hearing loss of a user of the hearing device.

The hearing device may comprise a processing unit, a memory unit and an interface. The interface may comprise a wireless transceiver, e.g. configured for wireless communication at frequencies in the range from 2.4 to 2.5 GHz.

The processing unit is configured to receive a session request for a session via the interface. The processing unit may be configured to verify the session request, such as authenticate the sender of the session request, e.g. a client device or a server device. It may envisaged that the hearing device and the sender of the session request have pre-established authenticated connection which thus permits the session request to be authenticated by the hearing device. The session request may comprise a digital signature signature enabling authentication of the session request.

In one or more exemplary hearing devices, the session request comprises a digital signature. The processing unit may be configured to verify integrity of the session request, e.g. by verifying the digital signature. For example, a verifier of the processing unit may be configured to verify the digital signature. The processing unit 202 verifies the digital signature using a signature verification function and a public key of a sender that has generated the digital signature and included the digital signature in the session request. If the hearing device/processing unit determines that the digital signature is not successfully verified using the alleged public key of a sender, the hearing device disregards the session request and terminates the session. This may provide the advantage that the hearing device rejects session requests from unauthenticated parties, thereby reducing the risk of or limit the effects of a battery exhaustion attack The hearing device may be paired with a sender of the session request prior to receipt of the session request. In the pairing, the hearing device and the sending/client device device may have exchanged one or more of hearing device identifier, sender identifier, session key/identifier, etc.

The processing unit is configured to obtain and/or store a session key; and encrypt the session key, optionally based on a hearing device key. The session key may be a symmetric key. A symmetric session key may provide a lightweight processing of the security algorithms on the processing unit, such as lightweight encryption, lightweight decryption, lightweight integrity protection, etc.

The processing unit is configured to obtain the session key, and to obtain the session key may comprise to generate the session key, e.g. as a random or pseudo-random number. Thus the hearing device and/or the processing unit may comprise a number generator, e.g. configured to generate a random or pseudo-random number. By using a unique session key or session key from a large number of available session keys, the processing power requirements in the hearing device may be reduced. Further, simple encryption is facilitated and replay-attacks are prevented.

The hearing device key may be a symmetric key or a public key of a private-public key pair. The hearing device key may be stored in a permanent memory of the hearing device, e.g. during manufacture or during a fitting session.

The processing unit is configured to send a session response in response to the session request. The session response may comprise the encrypted session key. The session response may comprise a hearing device identifier and/or the session key. Thus, the processing unit may be configured to send a hearing device identifier and/or the session key in the session response. A session response comprising a hearing device identifier may enable the sender of the session request to obtain the hearing device key, either from a database or by requesting the hearing device key from the manufacturer, which in turn enables the sender of the session request to decrypt the session key and use the session key when sending session data to the hearing device.

The hearing device disclosed herein has the advantage of verifying integrity of received data, detecting any alteration and disregard altered data. The hearing device disclosed herein has the advantage to open a session only with authenticated parties, such as an authenticated fitting device, an authenticated accessory device, an authenticated external devices and/or an authenticated server.

The processing unit is configured to receive session data in the session via the interface. The processing unit may be configured to verify integrity of the session data. The session data may comprise a message authentication code. To verify integrity of the session data may comprise to verify the message authentication code, e.g. with the stored session key. The session data may comprise a digital signature. To verify integrity of the session data may comprise verifying the digital signature.

The processing unit may be configured to terminate the session if integrity of the session data is corrupted, i.e. verification of the integrity fails.

The processing unit may be configured to decrypt the session data with the session key. The processing unit may be configured to store at least part of decrypted session data in the memory unit. The processing unit may be configured to terminate the session if decryption of the session data fails. The session data may comprise fitting data, hearing device operating parameters, and/or firmware data.

The processing unit may be configured to compensate for hearing loss of a user of the hearing aid according to the received session data. Thus, a sender of the session request may control operation of the hearing device, either by sending fitting data, hearing device operating parameters, and/or firmware data. The disclosed hearing device and method prevents unauthorized access or control of a hearing device As used herein, the term "hearing device" refers to a device configured to assist a user in hearing a sound, such as a hearing instrument, a hearing aid device, a headset, a pair of headphones, etc.

FIG. 1 schematically illustrates an exemplary architecture 100 according to this disclosure. The architecture 100 comprises a hearing device 101, a client device 110, and a server device 111. The client device 110 may comprise a computing device acting as a client, such as a fitting device, a handheld device, a relay, a tablet, a personal computer, a mobile phone, and/or USB dongle plugged in a personal computer. The server device 111 may comprise a computing device configured to act as a server, i.e. to serve requests from the client device 110 and/or from the hearing device 101. The server device 111 may be controlled by the hearing device manufacturer.

The hearing device 101 may be connected to the client device 110 via a communication link 113, such as a bidirectional communication link and/or a wireless communication link. The wireless communication link may be carried over a short-range communication system, such as Bluetooth, Bluetooth low energy, IEEE 802.11, Zigbee. The hearing device 101 may be connected to the client device 110 over a network. The client device 110 may permit remote fitting of the hearing aid device where a dispenser connects to the hearing device via the client device 110 of the user.

The hearing device 101 may be connected to the server device 111 via a communication link 114 over a network 114*a*, such as a bidirectional and/or wireless communication link over a network. The client device 110 may be connected to the server device 111 via a communication link 112 over a network 112*a*, such as a bidirectional and/or wireless communication link over a network.

Figure 2:
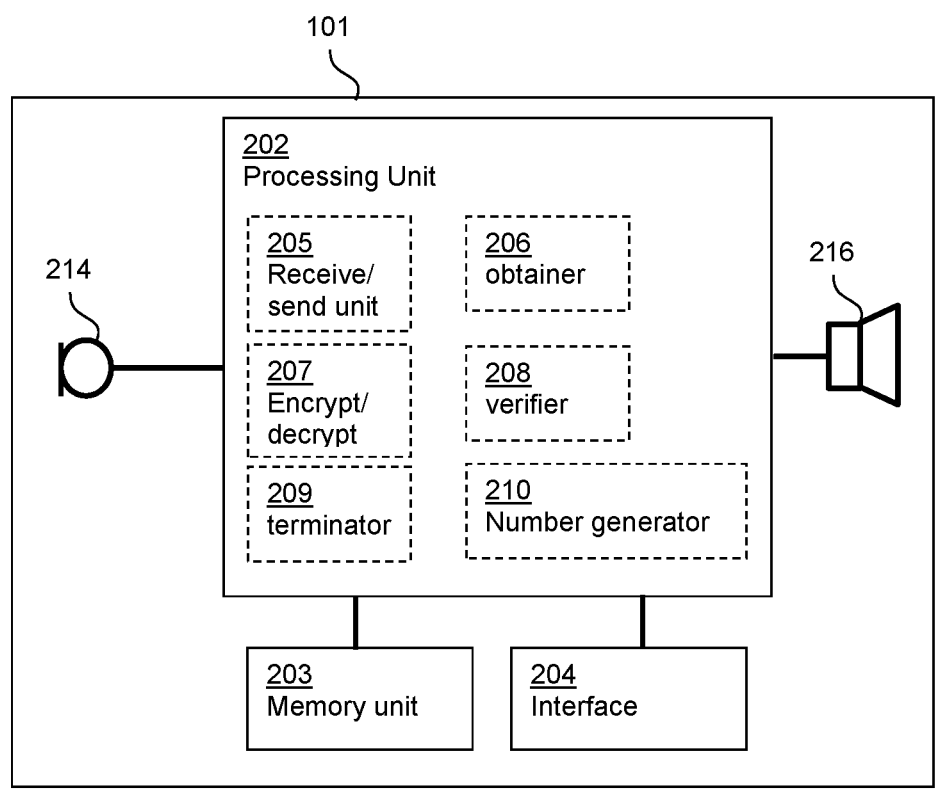

FIG. 2 schematically illustrates an exemplary hearing device 101. The exemplary hearing device 101 comprises a processing unit 202 configured to compensate for hearing loss of a user of the hearing device 101.

The exemplary hearing device 101 comprises a memory unit 203 and an interface 204 respectively connected to the processing unit 202. The processing unit 202 is configured to receive a session request for a session via the interface 204. Hence, the processing unit 202 comprises a receive/send unit 205 configured to send and/or receive via the interface 204. The receive/send unit 205 is configured to send and receive via the interface 204 to/from an external device, such as a server device, a client device, a fitting device, an accessory, a relay device, a smart phone, a tablet. The processing unit 202 is configured to obtain and store a session key. Hence, the processing unit 202 may comprise an obtainer 206 configured to obtain and/or generate the session key and to store the session key in e.g. the memory unit 203. To obtain the session key may comprise to generate a random or pseudo-random number with the number generator 210 contained in the hearing device 101. The processing unit 202 may comprise a random number generator 210. The session key obtained may be a 128-bits random or pseudo-random number, a 192-bits random or pseudo-random number, a 256-bits random or pseudo-random number, or any other bit-size random or pseudo-random number. The session key may be obtained so as to be compliant with an encryption standard such as Advanced Encryption Standard, AES, RSA crypto-system, Triple Data Encryption Algorithm, TDEA, Elliptic Curve Cryptographic system, any other encryption system. The session key may be uniquely generated for each session, using e.g. the number generator 210. This provides robustness against e.g. replay attacks.

The processing unit 202 is configured to encrypt the session key based on a hearing device key. Hence, the processing unit 202 may comprise an encrypt/decrypt unit 207. The processing unit 202 is configured to send a session response comprising the encrypted session key, for example by using the receive/send unit 205 and the interface 204. The processing unit 202 is configured to receive session data in the session via the interface 204, for example by using the receive/send unit 205 and the interface 204. The processing unit 202 receives the session data in the session from an external device, such as a client device 110 and/or a server device 111.

In one or more exemplary hearing devices, the processing unit 202 is configured to verify integrity of the session data. Thus, the processing unit 202 may comprise a verifier 208. For example, the processing unit 202 is configured to determine whether the integrity of the session data is corrupted, i.e. whether the session data has been tampered with or modified by an unauthorized party. The processing unit 202 detects e.g. an insertion, a deletion, and/or a substitution of data by an unauthorized party, such as by any party other than the sender.

In one or more exemplary hearing devices, the processing unit 202 is configured to terminate the session if integrity of the session data is corrupted. Thus, the processing unit 202 may comprise a terminator 209. For example, when it is determined by the processing unit 202 or the verifier 208 that the session data has been tampered with or modified (by e.g. insertion, deletion and/or substitution) by an unauthorized party, The processing unit 202 reject the received session data, and the terminator 209 or the processing unit 202 terminates the session with e.g. an external device. Terminating the session comprises deleting the session key from e.g. the memory unit 203. Deleting the session key protects the hearing device 101 against any replay attack or any attack based on any communication captured by an attacker.

In one or more exemplary hearing devices, the session data comprises a message authentication code, and the processing unit 202 verifying integrity of the session data is configured to verify the message authentication code with the stored session key. Thus, the verifier 208 is configured to verify the message authentication code with the stored session key. A message authentication code, MAC, is generated by a sender, such as an external device, based on the session data and the decrypted session key. Upon reception of the session data comprising the MAC, the hearing device which holds the stored session key is able to re-compute the MAC based on the received session data and a MAC generation function and compare the recomputed MAC with the received MAC. If the recomputed MAC does not match the received MAC, then the hearing device concludes that session data is corrupted. The hearing device disregards the session data and terminates the session. For example the processing unit 202 disregards the session data and terminates the session using the terminator 208.

In one or more exemplary hearing devices, the session data comprises a digital signature. The processing unit 202 verifying integrity of the session data is configured to verify the digital signature. For example, the verifier 208 is configured to verify the digital signature. The processing unit 202 verifies the digital signature using a signature verification function and a public key of a sender that has generated the digital signature and appended it to the session data. If the processing unit 202 determines that the digital signature is not successfully verified using the alleged public key of a sender, the processing unit 202 disregards the session data and terminates the session. This may provide the advantage that the hearing device 101 rejects session data tampered or received from unauthenticated parties and is thus robust against impersonation and masquerading attacks.

In one or more exemplary hearing devices, the processing unit 202 is configured to decrypt the session data with the session key, and to store at least part of decrypted session data in the memory unit 203. A client device 110 or a server device 111 may send encrypted session data to the hearing device 101. The processing unit 202 receives the encrypted session data via the receive/send unit 205 and the interface 204. The processing unit 202 retrieves the session key from e.g. the memory unit 203, and decrypts the session data using the retrieved session key and a decryption function. The processing unit 202 stores the decrypted session data in the memory unit 203. The processing unit 202 is configured to terminate the session if decryption of the session data fails. The decryption of the session data may fail if the session data is encrypted with a key different from the session key stored at the hearing device 101. This may provide the advantage that the hearing device 101 rejects session data received from parties not holding the session key and is thus robust against attacks based on such illegitimate data.

In one or more exemplary hearing devices, the session data comprises fitting data, hearing device operating parameters, and/or firmware data. Fitting data may for example be data generated by a fitting device used by a dispenser when a hearing device is being fitted in a user's ear. Fitting data may comprise hearing loss parameters, compressor parameters, filter coefficients, and/or gain coefficients. Hearing device operation parameters may comprise volume control parameters, mode and/or program control parameters. Firmware may refer to a computer program provided by the hearing device manufacturer, and to be installed on the hearing device to control the hearing device. Firmware is for example to be installed to upgrade the operations and capabilities of the hearing device.

In one or more exemplary hearing devices, the processing unit 202 is configured to compensate for hearing loss of a user of the hearing aid according to the received session data. The processing unit 202 may perform the hearing loss compensation based on the fitting data.

In one or more exemplary hearing devices, the session key comprises a symmetric key. The symmetric key may be uniquely generated for each session, using e.g. the number generator 210. The symmetric key may comprise an AES-128 bits key. The use of a symmetric key as a session key may reduce a processing power requirement, and allow the hearing device 101 to decrypt the session data with light encryption algorithms.

In one or more exemplary hearing devices, the hearing device key is a symmetric key or a public key of a private-public key pair. The hearing device key may comprise an AES-128 bits key as a symmetric key. The use of a symmetric as a hearing device key provides the advantage of being able to use hardware accelerators. The hearing device key may comprise a public key of a private-public key pair, such as a public key of a private-public key pair of an authorized discloser of the session key, such as of a server 111.

In one or more exemplary hearing devices, the processing unit 202 is configured to send a hearing device identifier in the session response. The hearing device identifier may refer to a unique device identifier. The hearing device identifier may comprise a hardware number, a serial number, a MAC address. The session response may comprise the encrypted session key and the hearing device identifier. The processing unit 202 is configured to send a hearing device identifier in the session response to an external device such as the client device 110 or to the server device 111. The hearing device key may be stored in a permanent memory, such as memory unit 203 of the hearing device 101 during production of the hearing device 101.

The hearing device comprises a microphone 214 for receiving a sound signal and converting it into converted sound signal. The converted sound signal may be an electrical and digital version of the sound signal. The processing unit is configured to receive and process the converted sound signal into a processed sound signal according to a hearing loss of a user of the hearing device. The processed sound signal may be compressed and/or amplified or the like. The hearing device further comprises an output transducer/loudspeaker, known as a receiver 216. The receiver 216 is configured to receive the processed sound signal and convert it to an output sound signal for reception by an eardrum of the user.

Figure 3A:
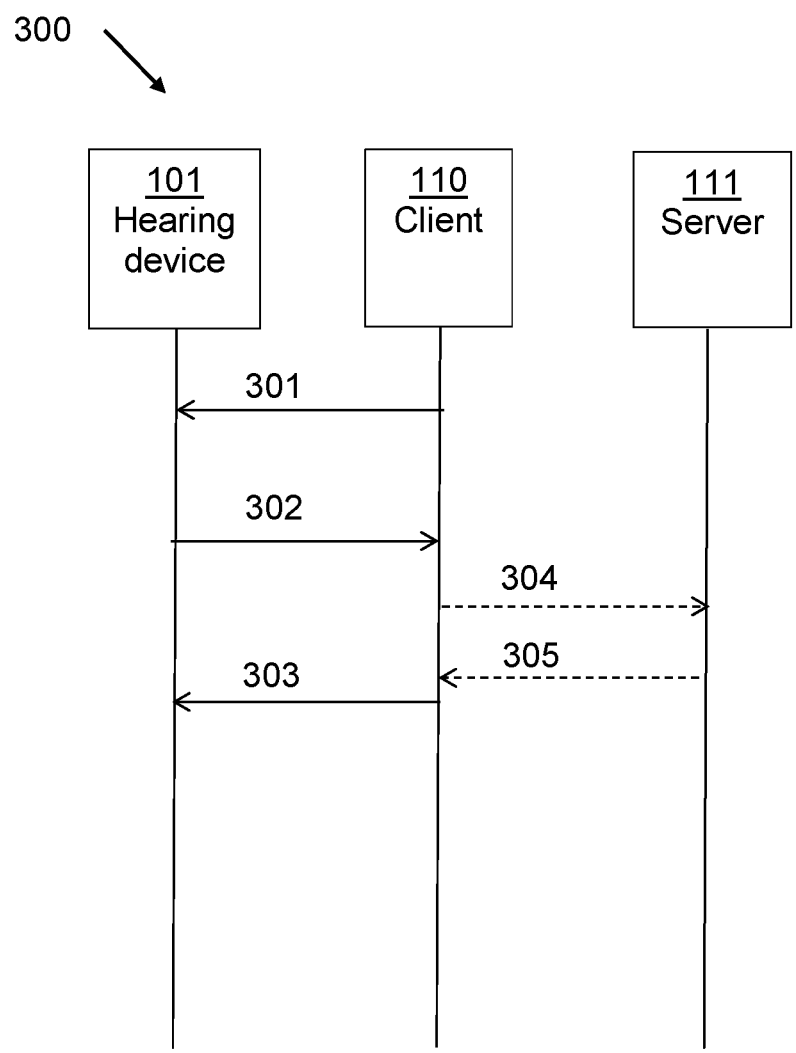

FIG. 3A shows an exemplary signalling diagram 300 between a hearing device 101, and a client device 110. The hearing device 101 receives a session request 301 for a session via the interface 204 from the client device 110. The hearing device 101 obtains and stores a session key. The hearing device 101 encrypts the session key based on a hearing device key. The hearing device 101 sends to the client device 110 a session response 302 comprising the encrypted session key. The hearing device 101 may alternatively send to the client device 110 a session response 302 encrypted with the hearing device key, the session response 302 comprising the session key. The client device 110 receiving the session response 302 may request 304 the server device 111 to decrypt the encrypted session key comprised in the session response 302, or to decrypt the encrypted session response 302. Based on the request 304, the server device 111 may send the decrypted session key in a response 305 to the client device 110. This may be when the hearing device key used at the hearing device 101 is a public key of a private-public key pair of the server 101. When the hearing device key is a symmetric key, the server device 111 may send the decrypted session key in a response 305 to the client device 110 or send the hearing device key in the response 305 to the client device 110 which is then capable of decrypting the session key or the session response 302. The response 305 may comprise the decrypted session key or the hearing device key. The communication link 112 between the client device 110 and the server device 111 is secure, i.e. authenticated, encrypted and/or integrity protected using a security protocol (e.g. Transport Layer Security protocol). The hearing device 101 receives from the client device 110 session data 303 in the session via the interface 204. The session data 303 may then be encrypted and/or integrity-protected at the client device 110, e.g by use of the session key. In one or more exemplary hearing devices, the processing unit 202 is configured to verify integrity of the session data as described earlier in connection with FIG. 2. The session data 303 may comprise a message authentication code. A message authentication code, MAC, is generated by a sender, such as a client device/server device, based on the session data and the decrypted session key. Upon reception of the session data comprising the MAC, the hearing device which holds the stored session key is able to re-compute the MAC based on the received session data and a MAC generation function and compare the recomputed MAC with the received MAC. If the recomputed MAC does not match the received MAC, then the hearing device concludes that session data is corrupted. The hearing device disregards the session data and terminates the session. For example the processing unit 202 disregards the session data and terminates the session using the terminator 208.

Figure 3B:
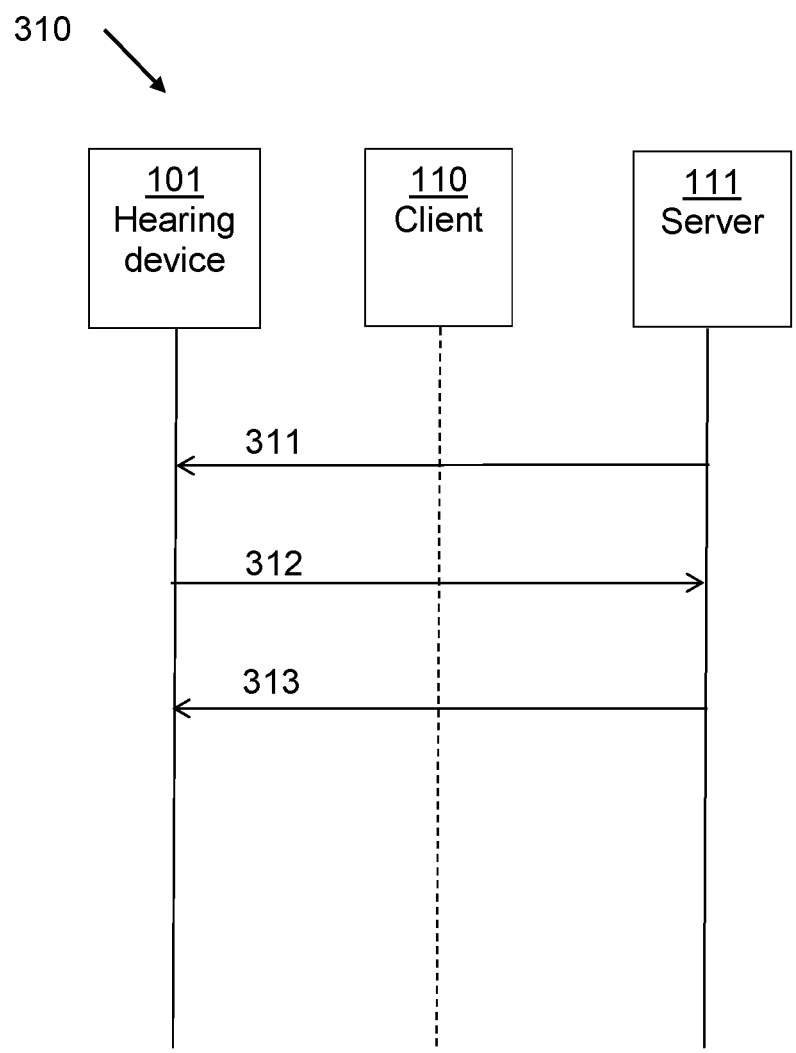

FIG. 3B shows an exemplary signalling diagram 310 between a hearing device 101, a client 110, and a server device 111. The hearing device 101 receives a session request 311 for a session via the interface 204 from the server device 111. The hearing device 101 obtains and stores a session key. The hearing device 101 encrypts the session key based on a hearing device key. The hearing device 101 sends to the server device 111 a session response 312 comprising the encrypted session key. The hearing device 101 may alternatively send to the server device 111 a session response 312 encrypted with the hearing device key, the session response 312 comprising the session key. The server device 111 may decrypt the encrypted session key comprised in the session response 312, or the encrypted session response 312. The communication link 112 between the hearing device 101 and the server device 111 may be over the client device 110 and/or over a network. The communication link 112 between the hearing device 101 and the server device 111 may or may not be secure, i.e. authenticated, encrypted and/or integrity protected using a security protocol. The hearing device 101 receives from the server device 111 session data 313 in the session via the interface 204. The session data 313 may then be encrypted and/or integrity-protected at the server device 111.

Figure 4:
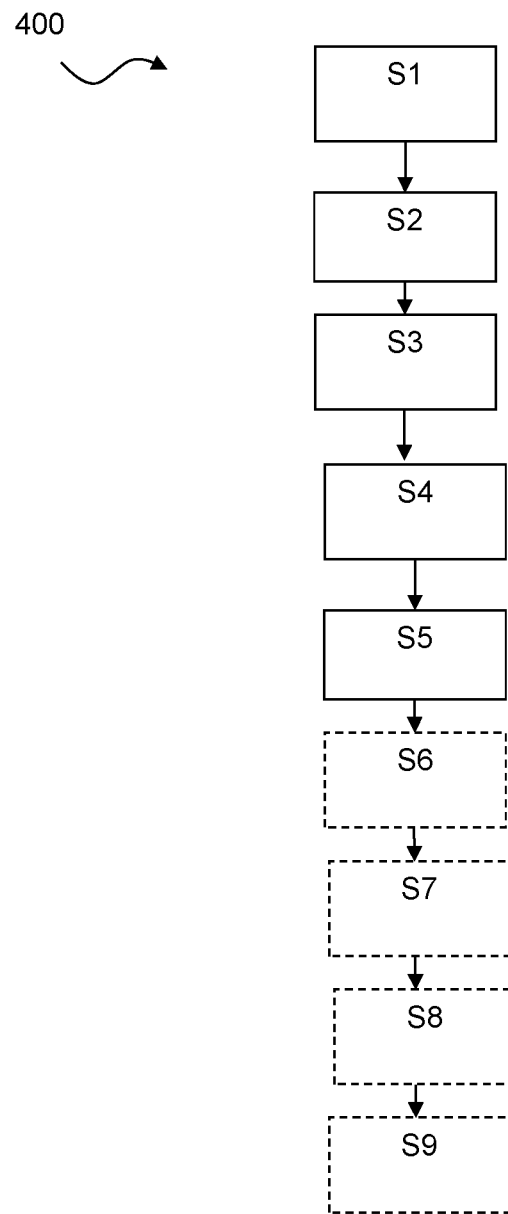

FIG. 4 schematically illustrates a flowchart 400 of an exemplary method according to this disclosure. The method 400 is proposed for communication of a hearing device 101 comprising a processing unit 202, a memory unit 203, and an interface 204, such as for protecting communication of a hearing device with e.g. an external device (client device and/or server device and/or accessory equipment). The method 400 is performed in the hearing device 101. The method 400 comprises receiving S1 a session request for a session via the interface 204. Receiving S1 may comprise receiving a session request from an external device, such as the client device 110 and/or the server device 111.

The method 400 comprises obtaining and storing S2 a session key, such as in a memory unit 203. Obtaining and storing S2 a session key, such as in a memory unit 203 may comprise generating a random or pseudo-random number with the number generator 210 contained in the hearing device 101. Obtaining and storing S2 a session key may comprise generating a 128-bits random or pseudo-random number, a 192-bits random or pseudo-random number, a 256-bits random or pseudo-random number, or any other bit-size random or pseudo-random number.

The method 400 comprises encrypting S3 the session key based on a hearing device key. Encrypting S3 the session key based on a hearing device key may comprise using an encryption standard such as Advanced Encryption Standard, AES, RSA crypto-system, Triple Data Encryption Algorithm, TDEA, Elliptic Curve Cryptographic system, any other encryption system.

The method 400 comprises sending S4 a session response comprising the encrypted session key, and receiving S5 session data in the session via the interface. Sending S4 a session response comprising the encrypted session key may comprise sending the session response to a client device 110 and/or a server device 111. Receiving S5 session data in the session via the interface 204 may comprise receiving session data from a client device 110 and/or a server device 111.

In one or more exemplary methods, the method 400 comprises verifying S6 integrity of the session data. Verifying S6 integrity of the session data may comprise determining whether the integrity of the session data is corrupted, i.e. determining whether the session data has been tampered with or modified by an unauthorized party. Verifying S6 integrity of the session data may comprise detecting e.g. an insertion, a deletion, and/or a substitution of data by an unauthorized party, such as by any party other than the legitimate sender. Verifying S6 integrity of the session data may comprise verifying a message authentication code appended to the session data (e.g. using the stored session key) and/or a digital signature appended to the session data. When it is determined that the integrity of the session data is not corrupted, then the hearing device 101 may grant access to reading and/or writing memory areas to the external device. For example, the session data or hearing device data derived therefrom may be written in the memory unit 203.

The method 400 comprises terminating S7 the session if integrity of the session data is corrupted. For example, if it is determined that the session data has been tampered with or modified (by e.g. insertion, deletion and/or substitution) by an unauthorized party, terminating S7 comprises rejecting the received session data, and terminating the session with e.g. an external device. Terminating S7 may comprise deleting the session key from e.g. the memory unit 203.

In one or more exemplary methods, the method 400 comprises decrypting S8 the session data with the session key, and storing S9 at least part of decrypted session data in the memory unit. Decrypting S8 the session data with the session key may comprise retrieving the session key from e.g. the memory unit 203, and decrypts the session data using the retrieved session key and a decryption function.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 100 architecture
101 hearing device
111 server device
112 communication link between client device and server device
112a communication network
113 communication link between client device and hearing device
114 communication link between server device and hearing device
114a communication network
202 processing unit
203 memory unit
204 interface
205 receive/send unit
206 obtainer
207 encrypt/decrypt unit
208 verifier
209 terminator
210 number generator
214 microphone
216 receiver
300 signalling diagram
301 session request
302 session response
303 session data
304 request
305 response
310 signalling diagram
311 session request
312 session response
313 session data
400 method

The invention claimed is:

1. A hearing device comprising:
a processing unit configured to compensate for hearing loss of a user of the hearing device; and
an interface;
wherein the hearing device is configured to:
obtain a session request,
obtain or generate a session key,
encrypt the session key based on a hearing device key,
transmit a session response comprising the encrypted session key via the interface, and
receive session data via the interface that transmits the session response.

2. The hearing device of claim 1, further comprising a memory unit, and wherein the hearing device is configured to:
decrypt the session data with the session key, and
store at least a part of the decrypted session data in the memory unit.

3. The hearing device of claim 2, wherein the hearing device is configured to terminate a session if decryption of the session data fails.

4. The hearing device of claim 1, wherein the session data comprises fitting data, hearing device operating parameters, and/or firmware data.

5. The hearing device of claim 1, wherein the processing unit is configured to compensate for the hearing loss of the user of the hearing aid according to the received session data.

6. The hearing device of claim 1, wherein the key.

7. The hearing device of claim 1, wherein the hearing device is configured to generate the session key by generating a random or pseudo-random number with a number generator contained in the hearing device.

8. The hearing device of claim 1, wherein the hearing device key is a symmetric key or a public key of a private-public key pair.

9. The hearing device of claim 1, wherein the hearing device is configured to transmit a hearing device identifier in the session response.

10. The hearing device of claim 1, wherein the hearing device key is stored in a permanent memory of the hearing device.

11. The hearing device of claim 1, further comprising an encryption unit configured to encrypt the session key based on the hearing device key.

12. The hearing device of claim 1, wherein the hearing device is configured to receive, not generate, the session key.

13. The hearing device of claim 1, wherein the hearing device is configured to generate, not receive, the session key.

14. A hearing device comprising:
a processing unit configured to compensate for hearing loss of a user of the hearing device; and
an interface;
wherein the hearing device is configured to:
obtain or generate a session key,
encrypt the session key based on a hearing device key,
transmit a session response comprising the encrypted session key via the interface,
receive session data via the interface that transmits the session response, and
verify an integrity of the session data.

15. The hearing device of claim 14, further comprising a verifier configured to verify the integrity of the session data.

16. The hearing device of claim 15, further comprising a terminator configured to terminate a session if the verifier determines that the integrity of the session data is corrupted.

17. The hearing device of claim 14, wherein the hearing device is configured to terminate a session if the verifier determines that the integrity of the session data is corrupted.

18. The hearing device of claim 14, wherein the session data comprises a message authentication code, and wherein the hearing device is configured to verify the integrity of the session data by verifying the message authentication code with the stored session key.

19. The hearing device of claim 14, wherein the session data comprises a digital signature, and wherein the hearing device is configured to verify the integrity of the session data by verifying the digital signature.

20. The hearing device of claim 14, wherein the session data comprises fitting data, hearing device operating parameters, and/or firmware data.

21. The hearing device of claim 14, wherein the processing unit is configured to compensate for the hearing loss of the user of the hearing aid according to the received session data.

22. The hearing device of claim 14, wherein the session key is a symmetric key.

23. The hearing device of claim 14, wherein the hearing device is configured to generate the session key by generating a random or pseudo-random number with a number generator contained in the hearing device.

24. The hearing device of claim 14, wherein the hearing device key is a symmetric key or a public key of a private-public key pair.

25. The hearing device of claim 14, wherein the hearing device is configured to transmit a hearing device identifier in the session response.

26. The hearing device of claim 14, wherein the hearing device key is stored in a permanent memory of the hearing device.

27. A hearing device comprising:
a processing unit configured to compensate for hearing loss of a user of the hearing device; and
an interface configured to receive a session request;
wherein the hearing device is configured to:
obtain or generate a session key,
encrypt the session key based on a hearing device key,
transmit a session response comprising the encrypted session key, and
receive session data via the interface of the hearing device that receives the session request.

28. The hearing device of claim 27, further comprising a memory unit, and wherein the hearing device is configured to:
decrypt the session data with the session key, and
store at least a part of the decrypted session data in the memory unit.

29. The hearing device of claim 28, wherein the hearing device is configured to terminate a session if decryption of the session data fails.

30. The hearing device of claim 27, wherein the session data comprises fitting data, hearing device operating parameters, and/or firmware data.

31. The hearing device of claim 27, wherein the processing unit is configured to compensate for the hearing loss of the user of the hearing aid according to the received session data.

32. The hearing device of claim 27, wherein the session key is a symmetric key.

33. The hearing device of claim 27, wherein the hearing device is configured to generate the session key by generating a random or pseudo-random number with a number generator contained in the hearing device.

34. The hearing device of claim 27, wherein the hearing device key is a symmetric key or a public key of a private-public key pair.

35. The hearing device of claim 27, wherein the hearing device is configured to transmit a hearing device identifier in the session response.

36. The hearing device of claim 27, wherein the hearing device key is stored in a permanent memory of the hearing device.

37. The hearing device of claim 27, further comprising an encryption unit configured to encrypt the session key based on the hearing device key.

38. The hearing device of claim 27, wherein the hearing device is configured to receive, not generate, the session key.

39. The hearing device of claim 27, wherein the hearing device is configured to generate, not receive, the session key.

* * * * *